United States Patent
Cherniak et al.

(10) Patent No.: US 8,434,591 B2
(45) Date of Patent: May 7, 2013

(54) ACOUSTIC BARRIER

(75) Inventors: Ryan Joseph Cherniak, Woodbine, MD (US); David Brereton, Boca Raton, FL (US); Sam Rhodes, Boca Raton, FL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/239,337

(22) Filed: Sep. 21, 2011

(65) Prior Publication Data
US 2013/0068555 A1  Mar. 21, 2013

(51) Int. Cl.
*E04B 1/84* (2006.01)

(52) U.S. Cl.
USPC .............................. 181/294; 181/284; 181/292

(58) Field of Classification Search .................... 181/294
See application file for complete search history.

(56) References Cited

U.S. PATENT DOCUMENTS

| | | | |
|---|---|---|---|
| 4,488,619 A * | 12/1984 | O'Neill | 181/290 |
| 4,642,951 A * | 2/1987 | Mortimer | 52/145 |
| 5,214,894 A | 6/1993 | Glesser-Lott | |
| 5,274,200 A * | 12/1993 | Das et al. | 181/202 |
| 6,204,209 B1 * | 3/2001 | Rozek et al. | 442/374 |
| 7,503,429 B2 | 3/2009 | Boyce | |
| 2004/0039072 A1 | 2/2004 | Park | |
| 2004/0180592 A1 | 9/2004 | Ray | |
| 2005/0202213 A1 | 9/2005 | Yanai | |
| 2009/0078826 A1 * | 3/2009 | Haensch et al. | 244/129.5 |
| 2009/0250292 A1 * | 10/2009 | Hayasaka et al. | 181/290 |
| 2010/0108439 A1 | 5/2010 | Seo | |
| 2010/0133039 A1 * | 6/2010 | Liguore | 181/294 |
| 2011/0100748 A1 | 5/2011 | Nonogi et al. | |
| 2011/0111192 A1 | 5/2011 | Lioveras Caivo | |

* cited by examiner

*Primary Examiner* — Forrest M Phillips
(74) *Attorney, Agent, or Firm* — Taft Stettinius & Hollister LLP; Keith Swedo

(57) ABSTRACT

An acoustic dampening panel comprising: (a) a first layer of expanded polypropylene; (b) a solid layer having a surface weight between 2.4 kilograms per meter squared and 25 kilograms per meter squared; and, (c) a second layer of expanded polypropylene, where the first and second layers of expanded polypropylene sandwich the solid layer therebetween. The acoustic dampening panel may further comprise a fourth layer comprising a metal skin, where the solid layer and the metal skin sandwich the second layer therebetween.

20 Claims, 4 Drawing Sheets

ACOUSTIC BARRIER

RELATED ART

1. Field of the Invention

The invention is directed to acoustic barriers and, more specifically, to acoustic barriers comprising a multi-layer construction.

2. Brief Discussion of Related Art

Heating or cooling equipment employing a compressor is plagued by loud noise levels in the low frequency region. Yet this same heating and cooling equipment are required to meet certain noise levels for residential and commercial applications. Prior acoustic insulation comprised a standard sheet metal layer with a fiberglass backer panel. But this acoustic insulation resonates due to an excitation frequency originating at the compressor. Thus, there is a need for an effective acoustic barrier or dampener to prevent or reduce airborne noise transmission into the space the equipment is intended to condition.

INTRODUCTION TO THE INVENTION

The invention is directed to acoustic barriers and dampeners. In exemplary form, the embodiments disclosed herein utilize a multi-layer configuration of insulating layers. These insulating layers may be mounted to an outer skin in order to provide a single, integrated structure. By way of example, the multi-layer configuration may make use of multiple polymer layers comprising polypropylene and vinyl. More specifically, an exemplary multi-layer configuration may include a layer of high density expanded polypropylene, a layer of mass loaded vinyl, and a layer of low density expanded polypropylene.

The exemplary multi-layer configurations disclosed herein provide an effective acoustic barrier or dampener for use as panels in heating, ventilation, and air conditioning (HVAC) applications. The layout, densities, and thicknesses of the layers are operative to create a reduction in airborne noise between 60 and 10,000 Hz. The exemplary embodiments disclosed herein are also effective at low frequency attenuation through the reduction of resonances at the outer panel surface, when an outer panel is utilized (such as a metal panel).

It is a first aspect of the invention to provide an acoustic dampening panel comprising: (a) a first layer of expanded polypropylene; (b) a solid layer having a surface weight between 2.4 kilograms per meter squared and 25 kilograms per meter squared; and, (c) a second layer of expanded polypropylene, where the first and second layers of expanded polypropylene sandwich the solid layer therebetween.

In a more detailed embodiment of the first aspect, the first layer comprises high density expanded polypropylene. In yet another more detailed embodiment, the high density expanded polypropylene has a thickness between five to twenty millimeters. In a further detailed embodiment, the solid layer comprises mass loaded vinyl. In still a further detailed embodiment, the mass loaded vinyl has a thickness between two to six millimeters. In a more detailed embodiment, the second layer comprises low density, porous expanded polypropylene. In a more detailed embodiment, the low density, porous expanded polypropylene has a thickness between five to thirty millimeters. In another more detailed embodiment, the panel further includes a fourth layer comprising a metal skin, wherein the solid layer and the metal skin sandwich the second layer therebetween. In yet another more detailed embodiment, the metal skin comprises at least one of an aluminum layer, an aluminum alloy layer, and a substrate coated with aluminum. In still another more detailed embodiment, the metal layer has a thickness between 0.5 to 1.25 millimeters.

In yet another more detailed embodiment of the first aspect, the panel further includes an adhesive interposing at least two of the layers. In still another more detailed embodiment, the metal skin includes a sheet portion parallel and spaced apart from a flange and, the flange and the sheet portion sandwich the first layer of expanded polypropylene, the solid layer, and the second layer of expanded polypropylene therebetween.

It is a second aspect of the invention to provide a method of acoustically insulating a device, the method comprising: (a) enclosing a device using a plurality of acoustic dampening panels, wherein at least one of the plurality of acoustic dampening panels comprises: (i) a first layer of expanded polypropylene; (ii) a solid layer having a surface weight between 2.4 kilograms per meter squared and 25 kilograms per meter squared; and, (iii) a second layer of expanded polypropylene, where the first and second layers of expanded polypropylene sandwich the solid layer therebetween.

In a more detailed embodiment of the second aspect, the device comprises at least one of a heating device, a ventilation device, and an air conditioning device. In yet another more detailed embodiment, the device comprises a compressor. In a further detailed embodiment, the step of enclosing the device includes mounting the plurality of acoustic dampening panels together using at least one of fixation tabs, fixation detents, and an adhesive.

It is a third aspect of the invention to provide an acoustic dampening panel comprising: (a) a first layer of expanded polypropylene; (b) a second layer of mass loaded vinyl; and, (c) a third layer of expanded polypropylene, where the first and third layers of expanded polypropylene sandwich the solid layer therebetween.

In a more detailed embodiment of the third aspect, the panel further includes a fourth layer comprising a metal skin, wherein the second layer and the metal skin sandwich the third layer therebetween. In yet another more detailed embodiment, the metal skin includes a sheet portion parallel and spaced apart from a flange and, the flange and the sheet portion sandwich the first layer of expanded polypropylene, the second layer of mass loaded vinyl, and the third layer of expanded polypropylene therebetween.

DETAILED DESCRIPTION

The exemplary embodiments of the invention are described and illustrated below to encompass acoustic barriers or dampeners. Of course, it will be apparent to those of ordinary skill in the art that the embodiments discussed below are exemplary in nature and may be reconfigured without departing from the scope and spirit of the invention. However, for clarity and precision, the exemplary embodiments as discussed below may include optional steps, methods, and features that one of ordinary skill should recognize as not being a requisite to fall within the scope of the invention.

Figure 1:
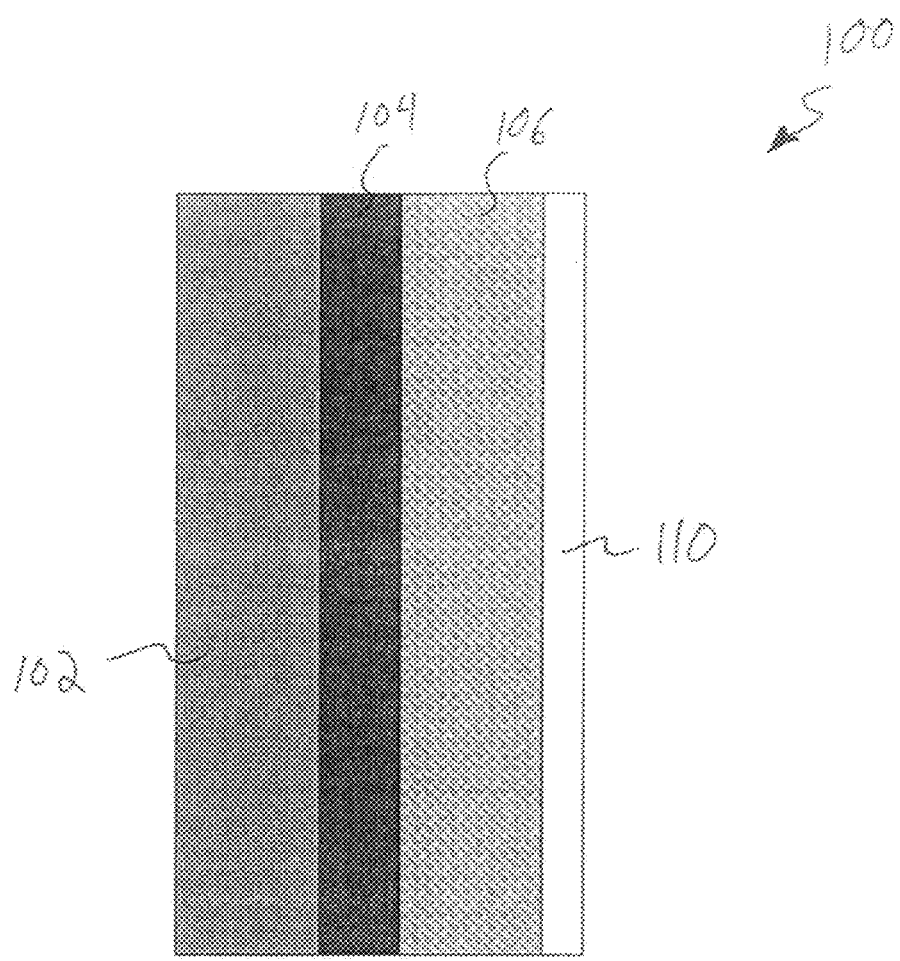
FIG. 1 is a cross-sectional view showing the layers of the first exemplary acoustic barrier.

Referencing FIG. 1, an exemplary configuration 100 that may be used as an acoustic barrier or dampener comprises multiple layers of acoustic insulation. This configuration allows for the reduction of any excitation frequencies before reaching the outermost panel or layer, thereby significantly reducing sound radiated from the configuration surfaces into the surrounding environment.

In exemplary form, the configuration 100 comprises a first innermost layer 102 of high density expanded polystyrene or expanded polypropylene (EPP) mounted to a layer of mass loaded vinyl 104, which is itself mounted to a low density, porous EPP layer 106. The respective layers 102, 104, 106 have a generally uniform thickness across a respective length and width, characterized by thicknesses of the high density EPP layer 102 being between 5-20 millimeters, thicknesses of the mass loaded vinyl layer 104 being between 2-6 millimeters, and thicknesses of the low density, porous EPP layer 106 being between 5-30 millimeters. The layers 102, 104, 106 are positioned adjacent one another so that the EPP layers 102, 106 sandwich the vinyl layer 104 therebetween. In order to retain the layers 102, 104, 106 in an adjacent relationship, an adhesive may be applied to the exposed surfaces of the layers coming in contact with one another for form a mechanical bond between the layers.

Alternatively, or in addition, the exemplary configuration 100 may include an outer skin 110 to maintain the layers in an adjacent relationship. By way of example, the skin 110 may be fabricated from a sheet metal of any gauge such as, without limitation, steel, alloyed steel, coated steel, aluminum, alloyed aluminum, and coated aluminum. By way of example, and not limitation, the skin may have a thickness between 0.5-1.25 mm. The outer skin 110 is operative to reduce the sound transmission via mass dampening and provides a sealed surface. This sealed surface prevents or retards air leakage and subsequent airborne noise radiation.

The innermost EPP layer 102 is operative to absorb initial acoustic energy emanating from the surroundings. By way of example, the exemplary configuration 100 may be used to form an enclosure around an HVAC device. The innermost EPP layer 102 absorbs acoustic energy emanating from the HVAC device.

The mass loaded vinyl layer 104 serves as a mass-dampening sound transmission reduction layer.

The low density, porous EPP layer 106 is operative to absorb remaining low frequency acoustic energy.

Figure 2:
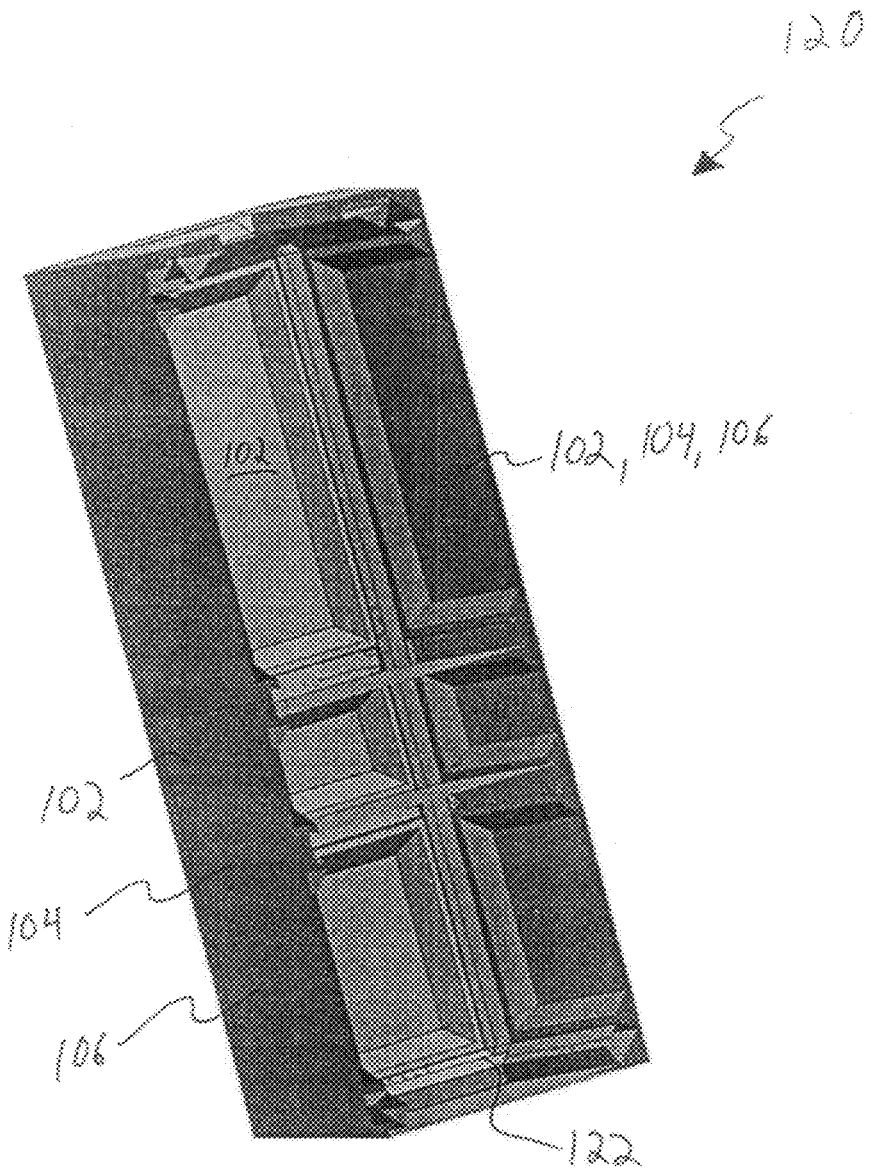
FIG. 2 is an elevated perspective view of an exemplary acoustic enclosure shown without a top, a bottom, one side wall, and an outer skin.

The thicknesses, masses, and densities of the layers 102, 104, 106 can be adjusted for optimal noise reduction in the air-handling (broadband) and condensing (low frequency) sections. As set forth below in Equation #1, an empirical diffuse field equation sets forth the relationship between sound reduction (i.e., sound transmission loss) and thickness and density of the sound barrier.

$$TL = 10 * \text{Log}_{10}\left(\left(1 + \frac{\rho_b h \omega}{2\rho c}\right)^2\right) - 5 \quad \text{Equation \#1}$$

where:
TL=Transmission Loss (dB)
ρb=Barrier Density
h=Barrier Thickness
ω=2*pi*Frequency
ρc=acoustic impedance of air Referring to FIG. 2, the exemplary configuration 100 may be used as an acoustic enclosure 120 that surrounds or partially surrounds a motor or other potential sound emitting device. In such a circumstance, the enclosure 120 may include an internal skeleton or frame 122 that is mounted to the exemplary configuration 100 to impart greater rigidity and support to the enclosure. In particular, the innermost EPP layer 102 is molded to include channels 126 that receive portions of the frame 122 in order to mount the frame to the innermost EPP layer.

Figure 3:
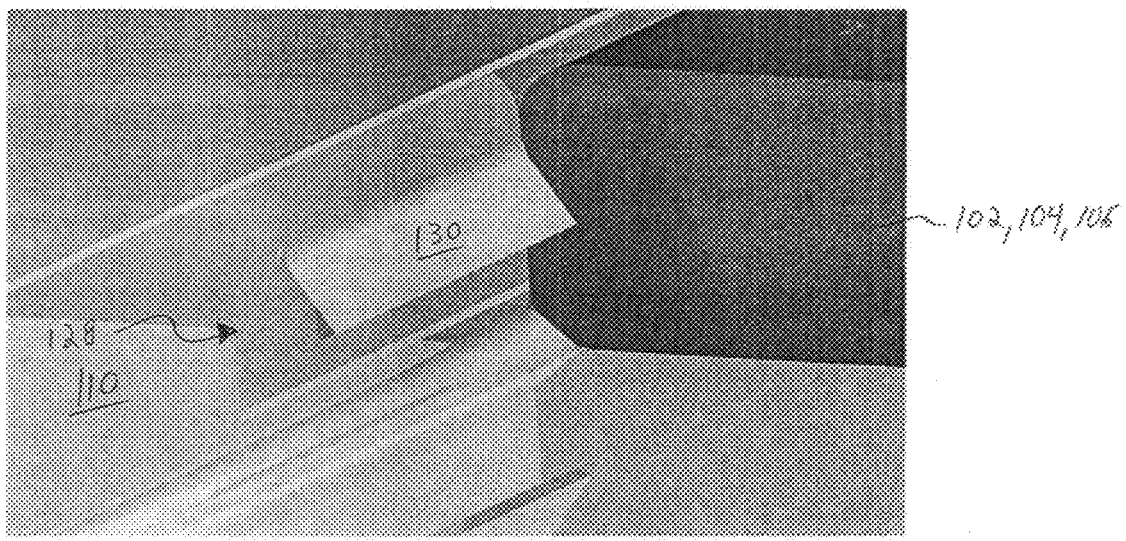
FIG. 3 is a magnified, elevated perspective cut-away view showing the position of a deflectable tab when the respective layers have been removed.
Figure 4:
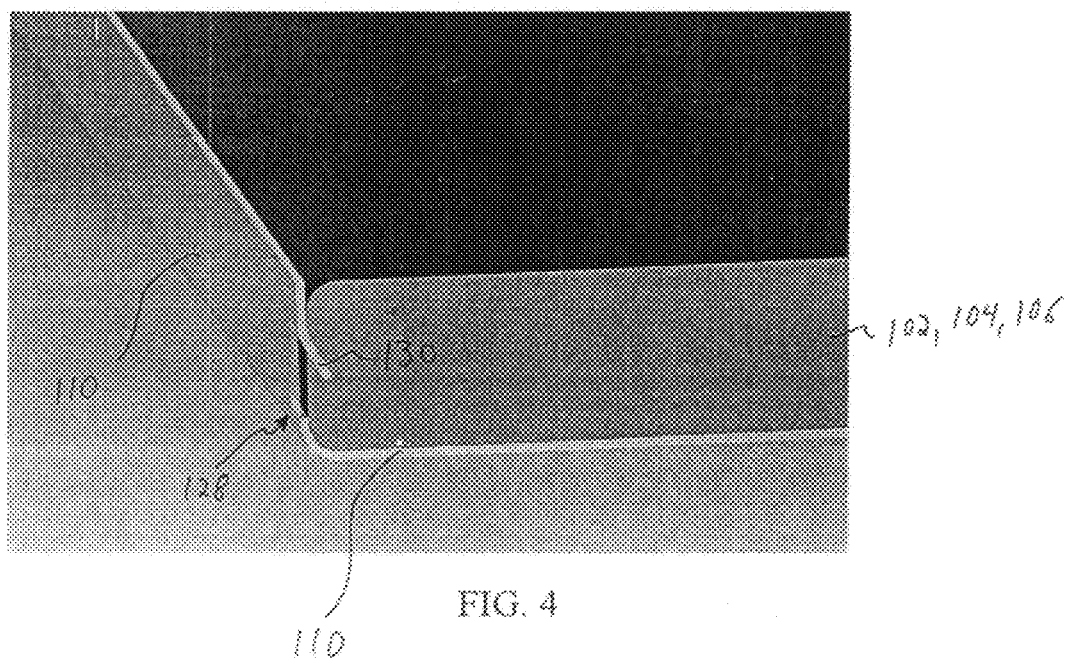
FIG. 4 is an elevated, cross-sectional view of the first exemplary acoustic barrier of FIG. 1 showing the orientation of the deflectable tab and the respective layers.

Referencing FIGS. 3 and 4, the exemplary acoustic enclosure 120 includes a sheet metal outer skin 110. In order to attach the outer skin 110 to the respective layers 102, 104, 106, the outer skin includes a series of cutouts 128 that define deflectable tabs 130. In exemplary form, the tabs are deflected inward toward the location where the respective layers 102, 104, 106 will be located prior to the layers being received within a cavity formed by the outer skin 110. However, it should also be noted that the tabs may be deflected after the outer skin 110 receives the respective layers 102, 104, 106.

Figure 5:
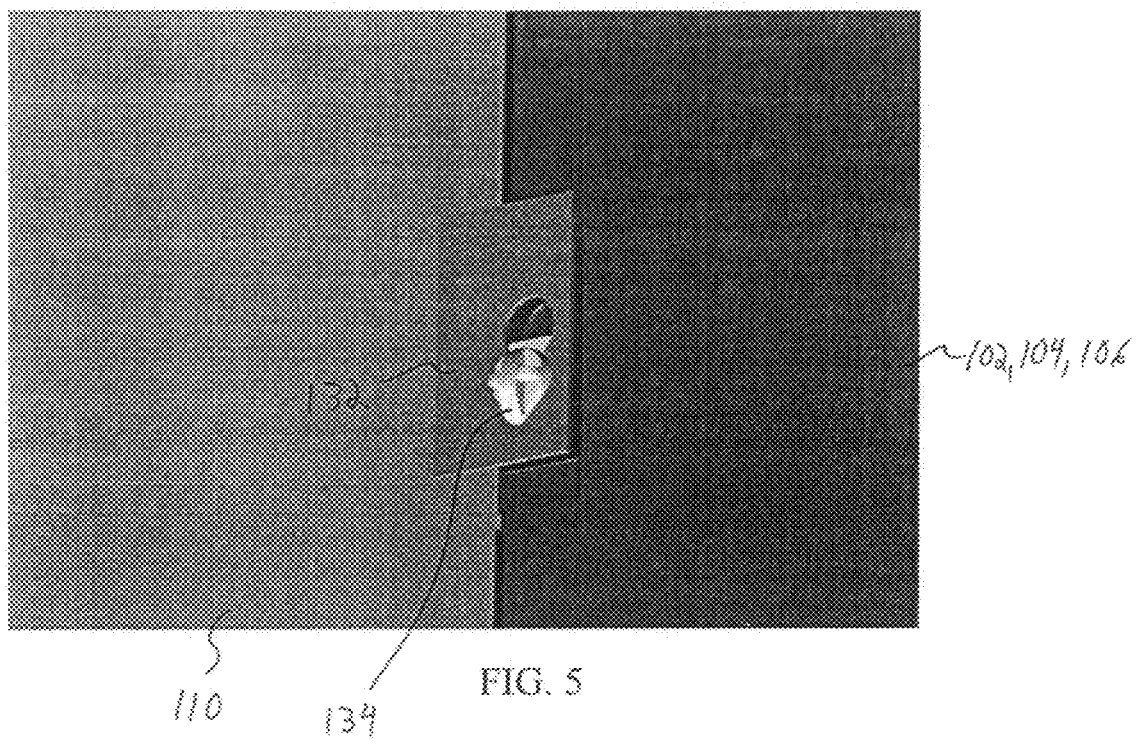
FIG. 5 is an elevated perspective view of a joint between the outer skin and the respective layers.

Referring to FIG. 5, it is preferable that gaps in the joints between the respective layers 102, 104, 106 and the outer skin 110 be minimized. Accordingly, it is also within the scope of the disclosure to provide the outer skin 110 with one or more detent receivers 132 that are adapted to engage one or more detents 134 mounted to the respective layers 102, 104, 106. In this manner, the layers may be compressed against the outer skin 110 and held in this position. It should also be noted that the deflectable tabs 130 may be used in lieu of or in addition to the detents 134 and detent receivers 132.

Following from the above description and invention summaries, it should be apparent to those of ordinary skill in the art that, while the methods and apparatuses herein described constitute exemplary embodiments of the invention, the invention is not limited to the foregoing and changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the invention may exist even though they may not have been explicitly discussed herein.

What is claimed is:

1. An acoustic dampening panel comprising:
    a first layer of expanded polypropylene;
    a solid layer having a surface weight between 2.4 kilograms per meter squared and 25 kilograms per meter squared; and,
    a second layer of expanded polypropylene,
    wherein the first and second layers of expanded polypropylene sandwich the solid layer therebetween.

2. The acoustic dampening panel of claim 1, wherein the first layer comprises high density expanded polypropylene.

3. The acoustic dampening panel of claim 2, wherein the high density expanded polypropylene has a thickness between five to twenty millimeters.

4. The acoustic dampening panel of claim 1, wherein the solid layer comprises mass loaded vinyl.

5. The acoustic dampening panel of claim 4, wherein the mass loaded vinyl has a thickness between two to six millimeters.

6. The acoustic dampening panel of claim 2, wherein the second layer comprises low density, porous expanded polypropylene.

7. The acoustic dampening panel of claim 6, wherein the low density, porous expanded polypropylene has a thickness between five to thirty millimeters.

8. The acoustic dampening panel of claim 1, further comprising a fourth layer comprising a metal skin, wherein the solid layer and the metal skin sandwich the second layer therebetween.

9. The acoustic dampening panel of claim 8, wherein the metal skin comprises at least one of an aluminum layer, an aluminum alloy layer, and a substrate coated with aluminum.

10. The acoustic dampening panel of claim 9, wherein the metal layer has a thickness between 0.5 to 1.25 millimeters.

11. The acoustic dampening panel of claim 1, further comprising an adhesive interposing at least two of the layers.

12. The acoustic dampening panel of claim 8, further comprising an adhesive interposing at least two of the layers.

13. The acoustic dampening panel of claim 8, wherein:
the metal skin includes a sheet portion parallel and spaced apart from a flange; and,
the flange and the sheet portion sandwich the first layer of expanded polypropylene, the solid layer, and the second layer of expanded polypropylene therebetween.

14. A method of acoustically insulating a device, the method comprising:
enclosing a device using a plurality of acoustic dampening panels, wherein at least one of the plurality of acoustic dampening panels comprises:
a first layer of expanded polypropylene;
a solid layer having a surface weight between 2.4 kilograms per meter squared and 25 kilograms per meter squared; and,
a second layer of expanded polypropylene,
wherein the first and second layers of expanded polypropylene sandwich the solid layer therebetween.

15. The method of claim 14, wherein the device comprises at least one of a heating device, a ventilation device, and an air conditioning device.

16. The method of claim 14, wherein the device comprises a compressor.

17. The method of claim 14, wherein the step of enclosing the device includes mounting the plurality of acoustic dampening panels together using at least one of fixation tabs, fixation detents, and an adhesive.

18. An acoustic dampening panel comprising:
a first layer of expanded polypropylene;
a second layer of mass loaded vinyl; and,
a third layer of expanded polypropylene,
wherein the first and third layers of expanded polypropylene sandwich the solid layer therebetween.

19. The acoustic dampening panel of claim 18, further comprising a fourth layer comprising a metal skin, wherein the second layer and the metal skin sandwich the third layer therebetween.

20. The acoustic dampening panel of claim 18, wherein:
the metal skin includes a sheet portion parallel and spaced apart from a flange; and,
the flange and the sheet portion sandwich the first layer of expanded polypropylene, the second layer of mass loaded vinyl, and the third layer of expanded polypropylene therebetween.

* * * * *